106. COMPOSITIONS,
COATING OR PLASTIC.

Patented Sept. 29, 1931

1,824,854

UNITED STATES PATENT OFFICE

GERALD NOEL WHITE, OF LONDON, ENGLAND, ASSIGNOR OF ONE-HALF TO SCOTTISH DYES, LIMITED, OF GRANGEMOUTH, SCOTLAND

EMPLOYMENT OF CEMENT AND THE LIKE

No Drawing.   Application filed November 3, 1927, Serial No. 230,931, and in Great Britain November 10, 1926.

This invention relates to the treatment of cement in connection with building materials.

The principal or first matter with which it deals is the prevention of incrustation on cement and other building materials.

In carrying out my researches mainly from that aspect, however, I have arrived at other important applications of some or all of the materials which may be used for the prevention of incrustation as aforesaid.

I will first deal with the matter of incrustation.

It is well known that on exposure to the atmosphere structures or other articles made wholly or partly of cement and other building materials containing lime, and particularly those that contain free lime, tend to develop incrustation, the phenomenon being generally referred to as "carbonatation" or "laitance". Whilst in some cases this occurrence may not be considered as particularly objectionable, there are other cases in which such incrustations are undesirable, and this is particularly so in the case of cement or other building material which has been coloured, e. g., by mineral oxides or by vat dyestuffs according to the processes described in British specifications Nos. 6,479/26, 18,168/26 and 20,368/26 as the carbonatation causes a lightening effect or obscuring of the colour either uniformly over the whole surface, or in patches.

The principal object of the invention is to provide for the overcoming of this difficulty.

To that end I have made researches and I have found that carbonatation, which is due to the superficial formation of calcium carbonate, can be wholly or partially prevented or retarded by the addition to the building material of a substance preferably readily soluble in water capable of forming a highly insoluble product with lime. For this purpose I prefer to use ammonium carbonate.

Further I have found that:—

(a) If it be desired to make an addition substantially before use borax or the like may be employed.

(b) In place of ammonium carbonate or other soluble treating material slightly soluble or even insoluble bodies may be employed (such as an insoluble acid salt of calcium) for example, or calcium hydrogen phosphates for the purpose of neutralizing the calcium hydroxide and yielding substantially insoluble compounds.

(c) Among the carbonatation preventing agents which may be used specific mention is made in addition to those given above of boric acid, ammonium phosphate, ammonium metaphosphate, ammonium pyrophosphate, urea, ammonium carbamate and ammonium bicarbonate.

(d) Where coloration comes into question such colours as vat dyestuffs in the form of fine pastes as usually supplied for printing, for instance Caledon jade green, or Caledon brilliant purple RR, Caledon red BN, Caledon blue RC or the like in similar or other suitable form or mineral colours, for instance iron oxide or chrome green, may be employed.

My continued researches in the use of ammonium carbonate have led to increased utility of this substance and in order that the matter may be well understood I set out below what I have found to be a convenient theory whether in fact this be the true explanation of the actions which occur or not.

I have found that such an addition for example from about 25 per cent. to 50 per cent. by weight of dry commercial ammonium carbonate calculated on the weight of dry cement used improves the permanence against cracking of cement washes. The permanence of such washes is largely independent of the age of the surface to which it is applied. The method of procedure may consist of mixing the cement with an equal weight of saturated ammonium carbonate solution and applying it to the surface immediately. A preferred method of procedure is to apply to the surface a wash consisting only of cement gauged with water and immediately after to apply ammonium carbonate in the form of a saturated solution by means of a brush, such cement washes setting within a few minutes and continue setting until a durable surface is obtained.

In gauging cement with water containing a quantity of ammonium carbonate between 3 per cent. and 5 per cent. of the weight of the cement, the amount of ammonium carbonate is sufficient to react with only some 8 per cent. to 16 per cent. of the free lime present in the set cement leaving out of the question the reaction between ammonium carbonate and the calcium silicates and other calcium compounds. Precaution should be taken to provide that the ammonium carbonate is equally distributed so far as practical conditions will allow throughout the whole of the concrete mass and that local excesses of ammonium carbonate are not allowed to exist more than momentarily. In practice this condition can be satisfied by thoroughly incorporating the bulk of the gauging water with the cement, leaving the addition of ammonium carbonate in the form of a saturated solution to the end, mixing it in rapidly and efficiently.

In the case of cement and ammonium carbonate mixtures containing high proportions of ammonium carbonate, the first set normally occurs within a few minutes and if this first set be disturbed or the mixture is not applied sufficiently quickly it may fail to set. If undisturbed the mass sets and becomes hard during the course of a few days.

It is desirable in the case of washes to apply the cement wash gauged only with water and to carry out the admixture of ammonium carbonate by application in situ, mixing the ammonium carbonate in by means of a brush.

The effect on the setting properties of the cement of even small proportions, e. g., 5 per cent. of ammonium carbonate calculated on the weight of cement, is clearly noticeable, but in this case it only amounts to an increase in the setting time however prolonged is the process of application. It appears that the final strength of the cement or concrete is slightly raised which I regard as evidence that there occurs formation of a colloidal envelope round the cement particles, which, by gradual crystallization, becomes equivalent to a cement ground to a limiting fineness.

My invention consists in a method for the prevention or retardation of incrustation on cement or other building materials which comprises the incorporation therewith of a substance preferably readily soluble in water which will react with the lime to form a substantially insoluble compound or compounds, for example ammonium carbonate, boric acid, ammonium metaphosphate, ammonium phosphate, ammonium pyrophosphate, urea, ammonium carbamate and ammonium bicarbonate or a material slightly soluble or even insoluble, for example an insoluble salt of calcium, such as calcium hydrogen phosphate, for the purpose of neutralizing the calcium hydroxide and yielding substantially insoluble compounds.

The invention also consists in a method for the treatment of cement which comprises the incorporation therewith at a suitable stage and in a suitable form of an appropriate quantity of a protective agent, for example the employment in cement washes of about 25 per cent. to 50 per cent. by weight of dry commercial ammonium carbonate.

The invention also consists in a method of treating a building surface or the like which comprises the application to the surface of a wash consisting of cement or cementitious material gauged with water and the subsequent application of ammonium carbonate in the form of a substantially saturated solution.

The invention further consists in the employment of colours in conjunction with the treating agents referred to in the preceding three paragraphs.

The following examples illustrate how the invention may be carried into effect, all parts being parts by weight:—

*Example 1*

This is an example dealing with the prevention or retardation of incrustation.

A mixture of 100 parts of cement with 300 parts of sand are gauged with 20 parts of water, the mixing being continued until the distribution of the water appears to be complete. 10 parts of a solution of ammonium carbonate saturated at a normal temperature are then added and are incorporated as rapidly as possible. The concrete is then applied as desired in the ordinary way.

*Example 2*

This is an example dealing more particularly with resistance to cracking of cement washings and renderings.

100 parts of cement are gauged with 50 parts of water and the resulting slurry is applied to any desired surface previously wetted with water. As soon as the cement wash has been applied the whole is sprayed with a saturated solution of ammonium carbonate which is worked in and distributed rapidly by means of a brush.

*Example 3*

This is a modification of Example 2.

Concrete which has been recently made, and preferably in the condition of its first set, is treated with a saturated solution of ammonium carbonate applied by any suitable means and worked in rapidly with a brush.

Example 4

This is a modification of Example 1 employing ammonium phosphate.

According to this example in place of ammonium carbonate used in Example 1 there is employed for reaction with the lime an equivalent amount of di-hydrogen sodium phosphate.

Example 5

This is an example of the employment of ammonium carbonate in conjunction with a vat dyestuff, namely Caledon jade green.

2.5 parts of Caledon jade green standard paste as usually supplied to the calico printing trade and 2.5 parts of ammonium carbonate are mixed together and added to the gauging water for 100 parts of Portland cement and 200 parts of sand or other aggregate.

A larger quantity of Caledon jade green may be used, for example 7.5 parts instead of 2.5.

Example 6

This is a modification of Example 5 in which Caledon brilliant purple is used.

10 parts of Caledon brilliant purple RR in the form of a fine paste as usually supplied for printing and 5 parts of ammonium carbonate are added to the gauging water for 100 parts of cement and 300 parts of marble chips or other aggregate.

General

For the purpose of preventing or retarding carbonatation there may be employed among others any soluble substance which will react with lime to precipitate or form an insoluble compound but the material or materials selected should have the minimum (if any) adverse effect on the strength or other desired properties of the cement and the minimum liability to increase the formation of such soluble incrustations as are known as "efflorescence". As stated I prefer for this purpose to employ an ammonium compound especially ammonium carbonate.

The term "ammonium carbonate" as used herein includes the commercial material of that name and it is to this substance that the specific examples apply by way of illustration. This may be prepared for instance by subliming chalk with ammonium chloride or sulphate, and which is believed to consist of a mixture of ammonium carbamate and ammonium bicarbonate.

It is generally unnecessary to use that amount of ammonium carbonate or other reagent which is requisite to react with the whole of the free lime which is present in or may be formed during the setting and hydration of the cement, it being sufficient to add such a quantity as will suffice to retard seepage of lime in solution to the surface of the building material. In the case of cement about 1 per cent. to about 10 per cent. of commercial ammonium carbonate, calculated upon the weight of the cement, is usually required although the amount may vary according to the nature and composition of the building materials.

In place of adding the ammonium carbonate or other precipitant in the form of a solution by itself it may be added in admixture with any preparation to be used for colouring the cement or building material. If desired the precipitant may be added in the dry state. If ammonium carbonate be chosen as the precipitant, it should be added shortly before the use of the cement. If it be desired to make an addition substantially before use, borax or the like may be employed.

The precipitant added in the dry state should be thoroughly mixed with the dry cement or with the aggregates or with both. Any other suitable means for adding the reagent may be employed and if desired a plurality of suitable precipitating agents may be used.

As shown by some of the examples given above colouring material can be employed and this may be added either to the cement or to the ammonium carbonate or the like as preferred. Any suitable colouring material may be employed for instance vat dyestuffs or colouring matters such as anthraquinone vat dyestuffs or colouring matters, e. g., Caledon jade green. Caledon brilliant purple RR, Caledon red BN, Caledon blue RC in the form of fine pastes as normally supplied for printing and the corresponding dyestuffs sold under other trade descriptions or mineral colours, e. g., iron oxide or chrome green.

When ammonium carbonate is used in conjunction with vat dyestuff pastes the dyestuff appears to be carried down by the colloidal precipitate and become a part of the envelope surrounding the cement particles.

Having now described my invention, what I claim as new and desire to secure by Letters Patent is:—

The method of settling the color and arresting incrustation on the exposed surfaces of set cementitious material which comprises incorporating 3 to 5% of commercial ammonia carbonate with a cement containing free lime and vat dye stuff colors reacting to form a colloidal precipitate binding the color.

In testimony whereof I have signed my name to this specification.

GERALD NOEL WHITE.